United States Patent [19]

Delavaux

[11] Patent Number: 5,027,436

[45] Date of Patent: Jun. 25, 1991

[54] OPTICAL HYBRID FOR COHERENT DETECTION SYSTEMS

[75] Inventor: Jean-Marc P. Delavaux, Wescosville, Pa.

[73] Assignee: AT&T Bell Laboratories, Murray Hill, N.J.

[21] Appl. No.: 515,983

[22] Filed: Apr. 27, 1990

[51] Int. Cl.$^5$ .......................... G02F 1/00; H04J 11/00
[52] U.S. Cl. .................... 455/619; 455/616; 370/2
[58] Field of Search ............... 455/619, 616, 617, 610, 455/612; 370/2

[56] References Cited

U.S. PATENT DOCUMENTS

| | | | |
|---|---|---|---|
| 4,718,120 | 1/1988 | Tzeng | 455/616 |
| 4,723,315 | 2/1988 | Wetherell | 455/619 |
| 4,723,317 | 2/1988 | Glance | 455/619 |

OTHER PUBLICATIONS

"Polarization Diversity Coherent Optical . . . ", ECOC 88, Sep. 1988, M. Shibutani et al., pp. 151-154.
"Integrated Optics 90° Hybrid . . . ", Electr. Lett., vol. 24, No. 22, Oct. 1988, D. Hoffman et al., pp. 1324-1325.
"Active Controlled Fiber Optical 90° Hybrid . . . ", G. Berenbrock et al., IEEE Photonics Tech. Lett., vol. 1, No. 4, Apr. 1989, pp. 86-87.
"Integrated Optics Eight-Port 90° Hybrid . . . ", D. Hoffmann et al., IEEE J. Lightwave Tech., vol. 7, No. 5, May 1989, pp. 794-798.
Journal of Lightwave Technology, vol. LT-5, No. 2, Feb. 1987, pp. 274-276.
Demodulation of Optical DPSK Using In-Phase and Quadrature Detection, Hodgkinson et al., Jul. 31, 1985.

Primary Examiner—Reinhard J. Eisenzopf
Assistant Examiner—Kinfe-Michael Negash
Attorney, Agent, or Firm—W. W. Koba

[57] ABSTRACT

A polarization independent coherent lightwave detection arrangement is disclosed which utilizes an optical hybrid including a single polarization beam splitter and a single polarization maintaining coupler. The received message signal and a local oscillator signal are applied as orthogonal inputs to the beam splitter such that the pair of output signals contain orthogonal components from each input signal. The coupler functions to continue the pair of output signals such that a balanced receiver is capable of recovering the transmitted data signal, regardless of the polarization of the incoming message signal.

27 Claims, 1 Drawing Sheet

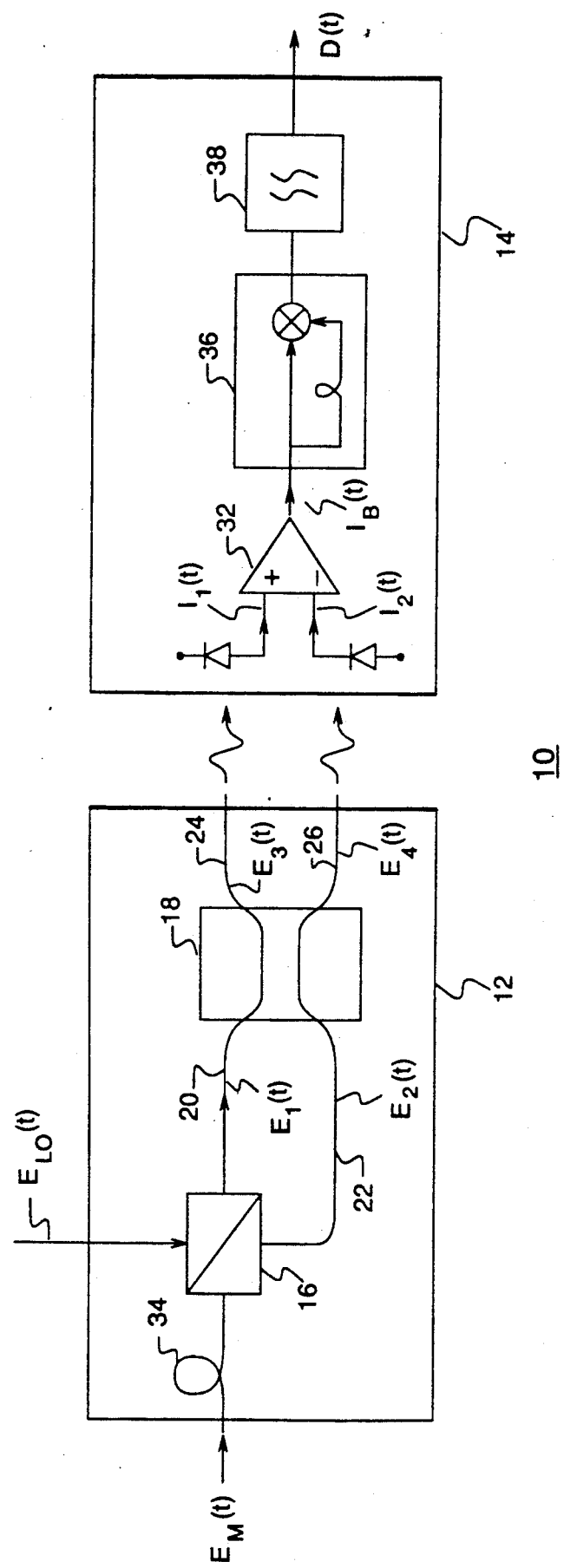

OPTICAL HYBRID FOR COHERENT DETECTION SYSTEMS

TECHNICAL FIELD

The present invention relates to an optical hybrid for coherent detection systems and, more particularly, to an optical hybrid which utilizes only one polarization beam splitter and one polarization maintaining coupler to achieve polarization independent operation.

DESCRIPTION OF THE PRIOR ART

Coherent optical lightwave detection systems have been extensively described in the literature. Such systems offer nearly ideal detection sensitivity, as well as selectivity similar to that obtained at radio frequencies. In coherent lightwave systems which use heterodyne/homodyne techniques, the polarization state of the local oscillator must be matched to the polarization state of the incoming transmitted signal in order to achieve accurate recovery of the data. Any departure from polarization matching will result in degradation of the system performance. One solution to the problem of polarization matching is the utilization of a polarization diversity receiver arrangement which insures correct operation of the system despite any fluctuations in the polarization state of the received data signal. In general, a polarization diversity arrangement functions to split both signals into known, orthogonal polarization states and separately manipulate each orthogonal component.

Several variations of polarization diversity schemes have been proposed and demonstrated. One particular prior art scheme utilizes an optical hybrid including a single beam splitting cube and a set of three optical couplers to provide the required orthogonal signal components. A description of this particular arrangement is contained in an article entitled "Polarization diversity coherent optical receiver with a balanced receiver configuration", by M. Shibutani et al., appearing in the *Proceedings of the ECOC88*, September 1988, at pp. 151–3. In the Shibutani et al. arrangement, the message signal components, after polarization separation, are mixed with the local oscillator in a 3 dB fiber coupler. The local oscillator signal is divided equally by a 3 dB coupler and the polarization state of each local oscillator component is manipulated, using polarization adjusters, to match the polarization state of its paired message signal component. However, since the polarization state of each signal component is subject to drift, the polarization adjusters must be continuously monitored to insure optimum system performance.

An alternative technique which is truly polarization independent and requires no active monitoring is disclosed in U.S. Pat. No. 4,718,120 issued to L. D. Tzeng on Jan. 5, 1988. In the Tzeng arrangement, the transmitted signal and local oscillator are simultaneously applied as inputs to a 3 dB coupler. The coupler outputs are then directed into a pair of polarization beam splitters which perform the polarization diversity function on the combination of the transmitted signal and local oscillator. The polarization diversity outputs from the pair of beam splitters are then directed into a balanced receiver which converts the optical signals into electrical representations and performs an electrical demodulation to recover the transmitted data. This arrangement is a viable solution, but the ability to provide matched polarization beam splitters which maintain the orthogonality between the various signal components may be difficult to achieve in some applications.

Therefore, a need remains in the prior art for a coherent lightwave detection system which is truly polarization independent and requires a minimum number of sensitive components.

SUMMARY OF THE INVENTION

The need remaining in the prior art is addressed by the present invention which relates to an optical hybrid for coherent detection systems and, more particularly, to an optical hybrid which utilizes only one polarization beam splitter and one polarization maintaining coupler to achieve polarization independent operation.

In accordance with a particular embodiment of the present invention, the incoming message signal and local oscillator are applied as orthogonal inputs to a polarization beam splitter. The polarization beam splitter functions to separate each signal into orthogonal components. In particular, message signal $E_M(t)$ is divided into components $E_{MH}(t)$ and $E_{MV}(t)$, where the designation "H" refers to "horizontal" polarization and the designation "V" refers to "vertical" polarization. The local oscillator is similarly split. Since the two signals are applied as orthogonal inputs to the splitter, the pair of outputs from the splitter contain mutually orthogonal components. That is, a first output $E_1(t)$ contains both a horizontal and a vertical component (e.g., $E_1(t) = E_{MH}(t) + jE_{LV}(t)$). The second output $E_2(t)$ from the splitter then contains the remaining components $E_{MV}(t)$ and $E_{LH}(t)$. The pair of outputs from the splitter are subsequently applied as inputs to a polarization maintaining coupler which functions to sum the components and provide as the optical hybrid output a pair of combined optical signals, denoted $E_3(t)$ and $E_4(t)$, which are orthogonal vector sums of the polarization beam splitter first and second outputs. In particular, polarization maintaining coupler 18 functions according to the following relations:

$$E_3(t) = \frac{E_1(t) + jE_2(t)}{\sqrt{2}}, \text{ and}$$

$$E_4(t) = \frac{E_2(t) - jE_1(t)}{\sqrt{2}}.$$

The pair of combined optical signals are then applied as inputs to a balanced receiver which functions to convert the optical signals into electrical representations and demodulate the electrical signals to recover the transmitted data from the received message signal $E_M(t)$.

In one embodiment of the present invention, bulk optics may be used to form the hybrid. In particular, a polarization beam splitting cube may be used to receive the message signal and local oscillator, where the fiber carrying the local oscillator is attached to the appropriate cube face at an angle (for example, 45°) which provides for essentially equal power splitting of the local oscillator between the two output polarization states. The polarization maintaining coupler may comprise a lithium niobate-based device, with polarization maintaining optical fibers used to interconnect the beam splitting cube and coupler, as well as connecting the coupler output to the balanced receiver input.

In an alternative embodiment, the hybrid may be formed as a monolithic unit on a single substrate. In particular, the polarization beam splitter and polarization maintaining coupler may be formed as integrated components within an optical substrate. Polarization maintaining integrated optical waveguides formed in the substrate may be used to interconnect the devices. In one arrangement, the balanced receiver may be incorporated in the same substrate. Alternatively, the receiver may be formed on a separate substrate with polarization maintaining waveguides used to provide interconnection between the hybrid and the receiver.

An advantage of the arrangement of the present invention is the significant reduction in the number of components required to achieve a polarization independent optical hybrid, as compared with the prior art. In particular, a conventional optical hybrid may utilize a pair of polarization beam splitters (one for the message signal and one for the local oscillator), and/or a pair of polarization maintaining couplers (one for each polarization state). Most optical hybrids of conventional design produce as an output a set of at least four separate signals (two of each polarization state), thus requiring the use of at least two balanced receivers to recover the message signal. In contrast, the optical hybrid of the present invention uses only one polarization beam splitter and one polarization maintaining coupler to generate as the output of the optical hybrid a pair of signals. Therefore, a single balanced receiver may be used to recover the message signal from the pair of optical hybrid output signals.

Other and further advantages of the present invention will be apparent during the course of the following dicsussion and by reference to the accompanying drawing.

BRIEF DESCRIPTION OF THE DRAWING

The sole FIGURE illustrates an exemplary coherent detection system utilizing an optical hybrid formed in accordance with the present invention.

DETAILED DESCRIPTION

Referring to the sole FIGURE, an exemplary coherent detection arrangement 10 is shown as including an exemplary optical hybrid 12 of the present invention and a balanced receiver 14 coupled thereto. As shown, optical hybrid 12 comprises a polarization beam splitter 16 and a polarization maintaining coupler 18 interconnected by a pair of polarization maintaining waveguides 20,22. A second pair of polarization maintaining waveguides 24,26 are used to connection the outputs of polarization maintaining coupler 18 (also defined as the output of hybrid 12) to the input of balanced receiver 14. As will be discussed in detail below, optical hybrid 10 may be formed with discrete devices, as a single monolithic structure, or with a mixture of both discrete and integrated components.

In operation, the received message signal $E_M(t)$ and local oscillator $E_{LO}(t)$ are applied as orthogonal inputs to polarization beam splitter 16. For the sake of the present discussion, message signal $E_M(t)$ is presumed to be a DPSK signal which can be expressed as follows:

$$E_M(t) = M(t) \sqrt{2P_M} \cos(\omega_M t).$$

where M(t) represents the DPSK modulation signal having values of either +1 (for a logic "1") or −1 (for a logic "0"). The term $P_M$ is defined as the message signal power and $\omega_M$ is defined as the carrier frequency.

It is to be noted that throughout this discussion any phase noise terms will be ignored, for the sake of simplicity. It can be shown that such terms do not affect the polarization independent operation of the hybrid of the present invention. Similarly, the local oscillator signal $E_{LO}(t)$ an be expressed as:

$$E_{LO}(t) = \sqrt{2P_{LO}} \cos(\omega_{LO}t),$$

where $P_{LO}$ is defined as the local oscillator signal power and $\omega_{LO}$ is the local oscillator carrier frequency.

Referring to the FIGURE, polarization beam splitter 16 functions to split the signals applied thereto into first and second components of orthogonal polarization states (hereinafter referred to as "vertical" ($\hat{V}$) and "horizontal" ($\hat{H}$) polarization states). When performing the polarization beam splitting on message signal $E_M(t)$, polarization beam splitter 16 divides the power $P_M$ of signal $E_M(t)$ into orthogonal components represented by:

$$P_M = \chi^2 P_M \hat{H} + (1-\chi^2) P_M \hat{V}.$$

where $\chi^2$ represents the portions of message signal $E_M(t)$ which is of the horizontal polarization state and the term $(1-\chi^2)$ represents the remaining portion of vertical polarization (where $0 \leq \chi \leq 1$, and $\chi$ may vary as a function of time). The message signal portions of the output from polarization beam splitter 16 may then be defined as:

$$E_{MH}(t) = M(t)\sqrt{2(1-\chi^2)P_M} \cos[\omega_M t - \theta_1]\hat{H}, \text{ and}$$

$$E_{MV}(t) = M(t)\sqrt{2\chi^2 P_M} \cos[\omega_M t - \theta_2]\hat{V}.$$

where $\theta_1$ and $\theta_2$ are slowly varying phase signals which depend upon the polarization state of the message signal.

In accordance with the teachings of the present invention, local oscillator $E_{LO}(t)$ is applied as an input to polarization beam splitter 16 with a fixed, linear polarization such that the resultant output signals launched into waveguides 20,22 will have essentially equal power levels. In general, therefore, the local oscillator may be defined as:

$$E_{LO}(t) = E_{LH}(t) + E_{LV}(t),$$

where $$E_{LH}(t) = \sqrt{P_{LO}} \cos[\omega_{LO}t + \theta_{LO}]\hat{H}, \text{ and}$$

$$E_{LV}(t) = \sqrt{P_{LO}} \cos[\omega_{LO}t + \theta_{LO}]\hat{V}.$$

where $\theta_{LO}$ is defined as the arbitrary phase of the local oscillator. For the remainder of the present discussion, it will be assumed that $\theta_{LO}=0$.

The outputs signals from polarization beam splitter 16 will be launched into polarization maintaining waveguides 20 and 22, as illustrated in the FIGURE, with the signal propagating along polarization maintaining waveguide 20 defined as $E_1(t)$ and the signal propagating along polarization maintaining waveguide 22 defined as $E_2(t)$. In accordance with the properties of polarization beam splitter 16, $E_1(t)$ and $E_2(t)$ may be defined by the following relations:

$$E_1(t) = E_{MH}(t) + jE_{LV}(t),$$

and $$E_2(t) = E_{LH}(t) + jE_{MV}(t).$$

Substituting the relations as defined above, signals $E_1(t)$ and $E_2(t)$ may be rewritten as follows:

$$E_1(t) = M(t)\sqrt{2(1-\chi^2)P_M}\cos[\omega_M t + \theta_1]\hat{H} +$$

$$\sqrt{P_{LO}}\sin(\omega_{LO} t)\hat{V}, \text{ and}$$

$$E_2(t) = M(t)\sqrt{2\chi^2 P_M}\sin[\omega_M t + \theta_2]\hat{V} +$$

$$\sqrt{P_{LO}}\cos(\omega_{LO} t)\hat{H}.$$

Referring to the FIGURE, signals $E_1(t)$ and $E_2(t)$ propagate along polarization maintaining waveguides 20,22 and are subsequently applied as inputs to polarization maintaining coupler 18. In general, polarization maintaining coupler 18 will provide a pair of output signals $E_3(t)$ and $E_4(t)$, where $$E_3(t) = \frac{E_1(t) + jE_2(t)}{\sqrt{2}}, \text{ and}$$

$$E_4(t) = \frac{E_2(t) + jE_1(t)}{\sqrt{2}}.$$

As seen in the FIGURE, signals $E_3(t)$ and $E_4(t)$ are launched into polarization maintaining waveguides 24 and 26, respectively, to form the outputs from optical hybrid 12. Assuming the length $l_1$ of the path defined by waveguides 20,24 is essentially equal to the length $l_2$ of the path defined by waveguides 22,26, first output $E_3(t)$ from hybrid 12 may be expressed as follows:

$$E_3(t) = E_{3H}(t) + E_{3V}(t),$$

where $$E_{3H}(t) = \frac{[M(t)\sqrt{2(1-\chi^2)P_M P_{LO}}\cos(\omega_M t + \theta_1) + \sqrt{P_{LO}}\sin(\omega_{LO} t)]\hat{H}}{\sqrt{2}}, \text{ and}$$

$$E_{3V}(t) = \frac{[-M(t)\sqrt{2\chi^2 P_M}\cos(\omega_M t + \theta_2) + \sqrt{P_{LO}}\sin(\omega_{LO} t)]\hat{V}}{\sqrt{2}}.$$

Similarly, signal $E_4(t)$ can be written as:

$$E_4(t) = E_{4H}(t) + E_{4V}(t),$$

where $$E_{4H}(t) = \frac{[M(t)\sqrt{2(1-\chi^2)P_M P_{LO}}\sin(\omega_M t + \theta_1) + \sqrt{P_{LO}}\cos(\omega_{LO} t)]\hat{H}}{\sqrt{2}}, \text{ and}$$

$$E_{4V} = \frac{[M(t)\sqrt{2\chi^2 P_M}\sin(\omega_M t + \theta_2) - \sqrt{P_{LO}}\cos(\omega_{LO} t)]\hat{V}}{\sqrt{2}}.$$

In order to provide recovery of the transmitted data signal, the pair of output optical signals $E_3(t)$ and $E_4(t)$ from hybrid 12 are applied as inputs to balanced receiver 14. In particular, signal $E_3(t)$ is applied as an input to a first photodiode 28 and signal $E_4(t)$ is applied as to a second photodiode 30. As is well-known in the art, each photodiode will develop an output current related to the applied input optical signal. In particular, the output current $I_1(t)$ from first photodiode 28 may be expressed as:

$$I_1(t) = C[E_{3H}^2(t) + E_{3V}^2(t)].$$

where C is defined as the known constant $\eta e/\hbar\omega$. Substituting the expressions for $E_{3H}(t)$ and $E_{3V}(t)$, it can be shown that $I_1(t)$ may be rewritten as follows:

$$I_1(t) = C\left[\frac{P_{LO}}{2} + \frac{P_M}{2} + \frac{M(t)}{2}\sqrt{2(1-\chi^2)P_M P_{LO}}\sin(\omega_{IF} - \theta_1)\right] -$$

$$C\left[\frac{M(t)}{2}\sqrt{2\chi^2 P_M P_{LO}}\sin(\omega_{IF} - \theta_2)\right].$$

where $\omega_{IF} = \omega_{LO} - \omega_M$. Similarly, the output current $I_2(t)$ from second photodiode 30 can be expressed as:

$$I_2(t) = C[E_{4H}^2(t) + E_{4V}^2(t)].$$

which may be rewritten as the following:

$$I_2(t) = C\left[\frac{P_{LO}}{2} + \frac{P_M}{2} - \frac{M(t)}{2}\sqrt{2(1-\chi^2)P_M P_{LO}}\sin(\omega_{IF} - \theta_2)\right] +$$

$$C\left[\frac{M(t)}{2} \sqrt{2\chi^2 P_M P_{LO}} \sin(\omega_{IF} t - \theta_2)\right].$$

Photocurrents $I_1(t)$ and $I_2(t)$ are subsequently applied as separate inputs to a differential amplifier 32. Differential amplifier 32 functions to subtract second photocurrent $I_2(t)$ from first current $I_1(t)$ to provide as an output the balanced receiver current $I_B(t)$. That is:

$$I_B(t) = I_1(t) - I_2(t),$$

where substituting the relations for $I_1(t)$ and $I_2(t)$, $I_B(t)$ can be rewritten as:

$$I_B(t) = CM(t) \sqrt{2P_M P_{LO}} [\sqrt{1-\chi^2} \sin(\omega_{IF} t - \theta_1) -$$

$$\sqrt{\chi^2} \sin(\omega_{IF} - \theta_2)].$$

This expression for $I_B(t)$ may be simplified by controlling the relationship between the terms $\theta_1$ and $\theta_2$. In particular, a phase modulator may be used in conjunction with the optical hybrid to provide this control. Referring to the FIGURE, a phase modulator 34 is illustrated as inserted in the incoming signal path of received message signal $E_M(t)$. Alternatively, phase modulator 34 may be disposed along either waveguide 20 or 22. Phase modulator 34 is utilized to maintain a predetermined phase difference $\Delta\theta$ between $\theta_1$ and $\theta_2$ (the slowly varying phase delays associated with the H and V polarizations of message signal $E_M(t)$, respectively). For example, phase modulator 34 may be used to provide a predetermined phase difference $\Delta\theta$ of $\pi/2$ such that $$\theta_2 \cong \theta_1 + \frac{\pi}{2}.$$

Therefore, the relation for $I_B(t)$ can be rewritten as follows:

$$I_B(t) = \frac{CM(t)}{2} \sqrt{2P_M P_{LO}} [\sqrt{1-\chi^2} \sin(\omega_{IF} t - \theta_1) -$$

$$\sqrt{\chi^2} \cos(\omega_{IF} t - \theta_1)].$$

since $$\sin(\theta_2) \cong \sin\left(\theta_1 + \frac{\pi}{2}\right) = -\cos(\theta_1).$$

Alternatively, phase difference $\Delta\theta$ may be set at multiple values of $$(2k + 1)\frac{\pi}{2}.$$

where k is a natural number, or any other suitable value capable of providing a well-controlled phase difference.

Referring to the FIGURE, current $I_B(t)$ from amplifier 32 is subsequently applied to a delay means 36 which functions to square the balanced receiver current. In particular, current $I_B(t)$ is split along two branches, where the current along one branch is delayed by a predetermined time period $\tau$. The delayed signal $I_B(t-\tau)$ and signal $I_B(t)$ are both applied as inputs to a multiplier 37 which then forms the output from delay means 36, denoted $D'(t)$. Thus, $D'(t)$ can be expressed as follows:

$$D'(t) = I_B(t - \tau).$$

Substituting for $I_B(t)$ and $I_B(t-\tau)$, it can be shown that:

$$D'(t) = \frac{C^2 M(t) M(t-\tau)}{4} P_M P_{LO}[\cos(\omega_{IF}\tau)] +$$

$$\frac{C^2 M(t) M(t-\tau)}{2} P_M P_{LO}[(\chi^2 - \frac{1}{2})\cos(2\omega_{IF} t - \Omega) +$$

$$\sqrt{\chi^2(1-\chi^2)} \sin(2\omega_{IF} t - \Omega)],$$

where $\Omega = \omega_{IF}\tau + 2\theta_1$. At this point in the data recovery process, the signal $D'(t)$ remains polarization dependent, due to the presence of "$\chi$" terms in the above relation. In accordance with the teachings of the present invention, the polarization dependence may be eliminated by removing the terms at the frequency $2\omega_{IF} t - \Omega$. Referring to the FIGURE, a filter 38 is coupled to the output of demodulating means 36. Filter 38 may be any suitable arrangement including, for example, a bandpass filter designed to pass only those frequencies near $\omega_{IF}$, or alternatively, a low pass filter capable of removing components near $2\omega_{IF}$. Depending upon the value of $2\omega_{IF}$, these higher-order harmonic terms may simply be ignored. In either case, the recovered data signal may be defined as $$D(t) = \frac{C^2 M(t) M(t-\tau)}{4} P_M P_{LO}\cos(\omega_{IF}\tau)],$$

which in accordance with the teachings of the present invention is independent of $\chi$.

As mentioned above, the optical hybrid of the present invention may be formed with discrete components or, alternatively, formed as a monolithic structure. An embodiment utilizing discrete devices may include, for example, a beam splitting cube as polarization beam splitter 16. Polarization maintaining coupler 18 may comprise a fused fiber coupler, formed using polarization maintaining optical fiber. Additionally, interconnecting waveguides 20, 22, 24 and 26 may all comprise polarization maintaining fibers appropriately attached to the appropriate endfaces of the discrete devices. In a monolithic embodiment, the polarization beam splitter may comprise a device including a silicon substrate with appropriate waveguides formed therein. A polarization maintaining coupler may also be formed in such a substrate. Advantages with the latter embodiment in terms of, for example, size, stability, alignment, and cost are obvious.

It is to be understood that there exist a number of modifications to the above-described embodiments which are considered to fall within the scope of the present invention. In particular, another embodiment of the present invention may utilize an alternative demodulating arrangement including a single photodiode receiver, instead of the pair of photodiodes in the balanced receiver configuration of the FIGURE. Additionally, the present invention is not considered to be limited to systems utilizing DPSK modulation, since alternative signaling schemes, including but not limited to FSK (frequency-shift keyed) or ASK (amplitude-shift keyed) modulation, could also be utilized with the optical hybrid of the present invention. In particular, the use of FSK signaling would result in a received message signal $E_M(t)$ of the form:

$$E_M(t) = \sqrt{2P_M} \cos((\omega_M + \Delta\omega)t,$$

where $\Delta\omega=0$ for a first logic value and is fixed at a constant for a second logic value. Alternatively, the use of ASK would result in a received message signal $E_M(t)$ of the form:

$$E_M(t) = M(t) \sqrt{2P_M} \cos\omega_M t,$$

where $M(t)=0$ for a first logic value and $M(t)=M$ for a second logic value.

I claim:

1. In a coherent lightwave detection system, an optical hybrid for providing polarization independent signal recovery, the hybrid including
   polarization splitting means responsive at a first input to a received message signal ($E_M(t)$) and at a second, orthogonal input to a local oscillator signal ($E_{LO}(t)$), the polarization splitting means for dividing each signal into first and second orthogonal components of first ($E_{MH}(t)$, $E_{LH}(t)$) and second ($E_{MV}(t)$, $E_{LV}(t)$) polarization states and forming first ($E_1(t)$) and second ($E_2(t)$) outputs of said polarization splitting means, each output comprising a sum of orthogonal components of each input signal; and
   polarization maintaining combining means disposed to receive as separate inputs the first and second outputs of the polarization splitting means and provide as the output of said optical hybrid a pair of combined signals ($E_3(t)$, $E_4(t)$), said pair of combined signals representative of orthogonal vector sums of the first and second outputs of said polarization splitting means.

2. An optical hybrid as defined in claim 1 wherein the hybrid further comprises
   polarization maintaining waveguiding means for interconnecting the first and second outputs of the polarization splitting means and the input of the polarization maintaining combining means.

3. An optical hybrid as defined in claim 2 wherein the polarization maintaining waveguiding means comprises polarization maintaining optical fiber.

4. An optical hybrid as defined in claim 2 wherein the polarization maintaining waveguiding means comprises integrated optical waveguides.

5. An optical hybrid as defined in claims 1 or 2 wherein the hybrid further comprises
   polarization maintaining waveguiding means coupled to the output of the polarization maintaining combining means for propagating the pair of combined signals to the output of the optical hybrid.

6. An optical hybrid as defined in claim 5 wherein the polarization maintaining waveguiding means comprises polarization maintaining optical fiber.

7. An optical hybrid as defined in claim 5 wherein the polarization maintaining waveguiding means comprises integrated optical waveguides.

8. An optical hybrid as defined in claim 1 wherein the hybrid further comprises
   phase modulating means for controlling a polarization-dependent phase difference ($\Delta\theta$) between the first and second components of the received message signal so as to maintain approximately a predetermined value.

9. An optical hybrid as defined in claim 8 wherein the predetermined phase difference is controlled to be approximately $\pi/2$.

10. An optical hybrid as defined in claim 8 wherein the predetermined phase difference is controlled to be approximately $\pi$.

11. An optical hybrid as defined in claim 8 wherein the predetermined phase difference is controlled to be approximately 0.

12. An optical hybrid as defined in claim 1 wherein the polarization splitting means comprises a polarization beam splitting cube.

13. An optical hybrid as defined in claim 1 wherein the polarization splitting means comprises an integrated polarization splitting means formed within an optical substrate.

14. An optical hybrid as defined in claim 1 wherein the polarization maintaining combining means comprises a fused fiber polarization maintaining optical coupler.

15. An optical hybrid as defined in claim 1 wherein the polarization maintaining combining means comprises an integrated polarization maintaining optical coupler formed within an optical substrate.

16. An optical hybrid as defined in claim 1 wherein the local oscillator signal is applied as a linearly polarized signal to the polarization splitting means.

17. An optical hybrid as defined in claim 16 wherein the local oscillator signal propagates along a polarization maintaining fiber which is coupled at an angle of approximately 45° to the polarization splitting means.

18. In a coherent lightwave detection system, an optical hybrid for providing polarization independent signal recovery, the hybrid including
   polarization splitting means responsive at a first input to a received message signal ($E_M(t)$) and at a second, orthogonal input to a local oscillator signal ($E_{LO}(t)$), the polarization splitting means for dividing each signal into first and second orthogonal components of first ($E_{MH}(t)$), $E_{LH}(t)$) and second ($E_{MV}(t)$,$E_{LV}(t)$) polarization states and forming first ($E_1(t)$) and second ($E_2(t)$) outputs of said polarization splitting means of the form:

$$E_1(t) = E_{MH}(t) + jEsubLV(t),$$

and $$E_2(t) = E_{LH}(t) + jE_{MV}(t);$$

and
   polarization maintaining combining means responsive to the first and second output from said polarization splitting means for combining said outputs and forming as the output from the optical hybrid a pair of combined signals ($E_3(t)$, $E_4(t)$) of the form:

$$E_3(t) = \frac{E_1(t) + jE_2(t)}{\sqrt{2}}, \text{ and}$$

$$E_4(t) = \frac{E_2(t) + jE_1(t)}{\sqrt{2}}.$$

19. A polarization independent coherent lightwave detection arrangement capable of recovering a data signal (D(t)) from a received message signal ($E_M(t)$), the detection arrangement comprising:
   an optical hybrid including
      polarization splitting means responsive at a first input to the received message signal ($E_M(t)$) and at a second, orthogonal input to a local oscillator signal ($E_{LO}(t)$), the polarization splitting means for dividing each signal into first and second orthogonal components of first ($E_{MH}(t)$, $E_{LH}(t)$) and second ($E_{MV}(t)$, $E_{LV}(t)$) polarization states and forming first ($E_1(t)$) and second ($E_2(t)$) output signals therefrom, each output comprising a sum of orthogonal components of each input signal; and
      polarization maintaining combining means disposed to receive as separate inputs the first and second outputs of the polarization splitting means and provide as the output of said optical hybrid a pair of combined signals ($E_3(t)$, $E_4(t)$), said pair of combined signals representative of orthogonal vector sums of the first and second outputs of the polarization splitting means; and
   the detection arrangement further comprising
   a receiver responsive to the pair of combined output signals from the polarization maintaining combining means for converting the optical signals into electrical representations thereof and combining said electrical representations to provide as an output the recovered data signal (D(t)).

20. A polarization independent coherent lightwave detection arrangement as defined in claim 19 wherein the optical hybrid further comprises
   phase modulating means for controlling a polarization-dependent phase difference ($\Delta\theta$) between the first and second components of the received signal so as to maintain approximately a predetermined value.

21. An optical hybrid as defined in claim 20 wherein the predetermined phase difference is controlled to be approximately $\pi/2$.

22. A polarization independent coherent lightwave detection arrangement as defined in claim 19 wherein the receiver comprises
   first converting means responsive to a first optical signal of the pair of combined signal outputs from the optical hybrid for providing as an output an electrical representation thereof;
   second converting means responsive to a second, remaining optical signal of the pair of combined signal outputs from said optical hybrid for providing as an output an electrical representation thereof; and
   demodulating means responsive to the electrical outputs from the first and second converting means for providing a difference signal and squaring said difference signal to form as the detection arrangement output the recovered data signal (D(t)).

23. A polarization independent coherent lightwave detection arrangement as defined in claim 22 wherein the demodulating means comprises
   differential amplifying means responsive to the outputs from the first and second converting means for generating the difference signal ($I_B(t)$);
   a delay line responsive to the difference signal for generating a delayed difference signal ($I_B(t-\Psi)$); and
   multiplying means responsive to both the difference signal and the delayed difference signal, the multiplicative product being the squared representation of the difference signal.

24. A polarization independent coherent lightwave detection arrangement as defined in claim 22 wherein the receiver further comprises
   filtering means responsive to the output from the demodulating means for removing components of the recovered data signal at frequencies other than the difference frequency ($\omega_{IF}$) between the local oscillator carrier frequency ($\omega_{LO}$) and the message signal carrier frequency ($\omega_M$).

25. A polarization independent coherent lightwave detection arrangement as defined in claim 19 wherein the received message signal is a DPSK modulated signal of the form:

$$E_M(t) = M(t)\sqrt{2P_M}\cos(\omega_M t), \text{ and}$$

$$E_{LO}(t) = \sqrt{P_{LO}}\cos(\omega_{LO} t).$$

26. A polarization independent coherent lightwave detection arrangement capable of recovering a data signal (D(t)) from a received message signal ($E_M(t)$), the detection arrangement comprising:
   an optical hybrid including
      polarization splitting means responsive at a first input to the received message signal ($E_M(t)$) and at a second, orthogonal input to a local oscillator signal ($E_{LO}(t)$), the polarization splitting means for dividing each signal into first and second orthogonal components of first ($E_{MH}(t)$, $E_{LH}(t)$) and second ($E_{MV}(t)$, $E_{LV}(t)$) polarization states and forming first ($E_1(t)$) and second $E_2(t)$) output signals therefrom, each output comprising a sum of orthogonal components of each input signal; and
      polarization maintaining combining means disposed to receive as separate inputs the first and second outputs of the polarization splitting means and provide as the output of said optical hybrid a pair of combined signals ($E_3(t)$, $E_4(t)$), said pair of combined signals representative of orthogonal vector sums of the first and second outputs of the polarization splitting means; and
   the detection arrangement further comprising
   a receiver responsive to the pair of combined output signals from the polarization maintaining combining means for converting the optical signals into electrical representations thereof and combining said electrical representations to provide as an output the recovered data signal, said receiver comprising
   first converting means responsive to a first optical signal of the pair of combined signal outputs from the optical hybrid for providing as an output a first photocurrent;
   second converting means responsive to a second, remaining optical signal of the pair of combined signal outputs from the optical hybrid for providing as an output a second photocurrent;

differentially amplifying means responsive to the first and second photocurrents for subtracting said second photocurrent from said first photocurrent and generating as an output a difference photocurrent;

delay means responsive to the difference photocurrent for generating a delayed difference photocurrent;

multiplying means responsive to both the difference photocurrent and the delayed difference photocurrent, the multiplicative product being the squared representation of the difference photocurrent; and filtering means responsive to the squared representation output from the multiplying means for removing components of said squared representation at frequencies other than the difference frequency ($\omega_{IF}$) between the local oscillator carrier frequency ($\omega_{LO}$) and the message signal carrier frequency ($\omega_M$), the output of the filtering means representing the recovered data signal.

27. The polarization independent coherent lightwave detection arrangement of claim 26 wherein
the first and second output signals of the polarization splitting means may be expressed by the relations $$E_1(t) = E_{MH}(t) + jE_{L1}(t),$$

and $$E_2(t) = E_{LH}(t) + jE_{MV}(t),$$

and
the pair of combined output signals of the optical hybrid may be expressed by the relations $$E_3(t) = \frac{E_1(t) + jE_2(t)}{\sqrt{2}}, \text{ and}$$

$$E_4(t) = \frac{E_2(t) + jE_1(t)}{\sqrt{2}}.$$

* * * * *